US011176452B2

(12) United States Patent
Porat et al.

(10) Patent No.: US 11,176,452 B2
(45) Date of Patent: Nov. 16, 2021

(54) METHOD AND SYSTEM FOR PIRACY DETECTION

(71) Applicant: Cisco Technology, Inc., San Jose, CA (US)

(72) Inventors: Uri Porat, Jerusalem (IL); Yoav Glazner, Beit Shemesh (IL); Amitay Stern, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 1036 days.

(21) Appl. No.: 15/444,351

(22) Filed: Feb. 28, 2017

(65) Prior Publication Data

US 2018/0247054 A1 Aug. 30, 2018

(51) Int. Cl.
| G06N 3/08 | (2006.01) |
| G06F 21/62 | (2013.01) |
| G06N 7/00 | (2006.01) |
| G06F 21/10 | (2013.01) |
| G06N 3/04 | (2006.01) |
| G06N 5/02 | (2006.01) |
| H04L 29/06 | (2006.01) |

(52) U.S. Cl.
CPC ............... *G06N 3/08* (2013.01); *G06F 21/10* (2013.01); *G06F 21/6272* (2013.01); *G06N 3/0427* (2013.01); *G06N 5/022* (2013.01); *G06N 7/005* (2013.01); *H04L 63/1425* (2013.01)

(58) Field of Classification Search
CPC .................................. G06N 20/00; G06N 3/08
See application file for complete search history.

(56) References Cited

U.S. PATENT DOCUMENTS

| 7,827,123 B1 * | 11/2010 | Yagnik .................. G06N 20/00 706/12 |
| 7,899,205 B2 | 3/2011 | Pelly et al. |
| 8,442,326 B2 | 5/2013 | Baudry et al. |
| 8,954,358 B1 | 2/2015 | Zhang et al. |

(Continued)

OTHER PUBLICATIONS

Guil et al., "A Clustering Technique for Video Copy Detection," (iBPRIA 2007) (Year: 2007).*

(Continued)

*Primary Examiner* — Baboucarr Faal
*Assistant Examiner* — Kevin L. Smith
(74) *Attorney, Agent, or Firm* — Behmke Innovation Group LLC; James M. Behmke; Jonathon P. Western

(57) ABSTRACT

In one embodiment, a system, apparatus and a method is described, the system, apparatus and a method including, a storage device and a memory operative to store target content items, a comparator operative to compare one content item of the target content items with the other target content items, and, at least on the basis of comparing the one content item of the target content items with the other content items of the target content items, to develop a correlation graph between each one content item of the target content items and the other content items of the target content items, and a machine learning system operative to receive the correlation graph and to output a decision, on the basis of in the correlation graph, indicating if the content items represented in the correlation graph are pirated content items or not. Related system, apparatuses and methods are also described.

16 Claims, 8 Drawing Sheets

(56) References Cited

U.S. PATENT DOCUMENTS

| | | | |
|---|---|---|---|
| 9,477,876 B2 | 10/2016 | Sukegawa et al. | |
| 9,489,621 B2 | 11/2016 | Hall et al. | |
| 2006/0277609 A1* | 12/2006 | Brandon | G06F 21/10 726/28 |
| 2008/0301767 A1* | 12/2008 | Picard | G06T 1/005 726/2 |
| 2013/0208942 A1* | 8/2013 | Davis | G06T 1/0021 382/100 |
| 2013/0294642 A1* | 11/2013 | Wang | G06K 9/00261 382/103 |

OTHER PUBLICATIONS

Lusson et al., "A Novel Approach to Digital Watermarking, Exploiting Colour Spaces," Signal Processing 93 (2013) (Year: 2013).*

Joey, Alexis et al.; Content-Based Copy Retrieval Using Distortion-Based Probabilistic Similarity Search, in IEEE Transactions on Multimedia, vol. 9, No. 2, pp. 293-306, Feb. 2007. doi: 10.1109/TMM.2006.886278.

Law-To, Julien et al.; Video Copy Detection: A Comparative Study, 2007; In Proceedings of the 6th ACM International conference on Image and video retrieval (CIVR '07). ACM, New York, NY, USA, 371-378, DOI=http://dx.doi.org/10.1145/1282280.1282336.

* cited by examiner

METHOD AND SYSTEM FOR PIRACY DETECTION

TECHNICAL FIELD

The present disclosure generally relates to methods and systems for comparing versions of content files.

BACKGROUND

Copyright holders seek to identify copyright violations which occur when copyrighted content, such as a copyrighted video, is pirated. Such content, to which access has been made available in violation of copyright, may be referred to as hacked video, hacked content, rogue content, pirated content, or other similar terms.

It is often the case that pirated content will be manipulated by pirates in an attempt to frustrate automatic detection systems, so that automatic detection via simple comparison becomes difficult. Such manipulations may include, for example, but not be limited to: change of color, cropping, rotation/translation, audio mute/swap, video format transcoding, etc. Sometimes these manipulations occur as incidental byproducts of conversion from a source to a digital replication of the source.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a system, apparatus and a method is described, the system, apparatus and a method including, a storage device and a memory operative to store a plurality of target content items, a comparator operative to compare each one content item of the plurality of target content items with the other content items of the plurality of target content items, and, at least on the basis of comparing each one content item of the plurality of target content items with the other content items of the plurality of target content items, to develop a correlation graph indicating a level of correlation between each one content item of the plurality of target content items and the other content items of the plurality of target content items, and a machine learning system operative to receive, as an input, the correlation graph and to output a decision, on the basis of the level of correlation shown in the correlation graph, which indicates if the content items represented in the correlation graph are pirated content items or are not pirated content items. Related system, apparatuses and methods are also described.

Example Embodiment

Figure 1:
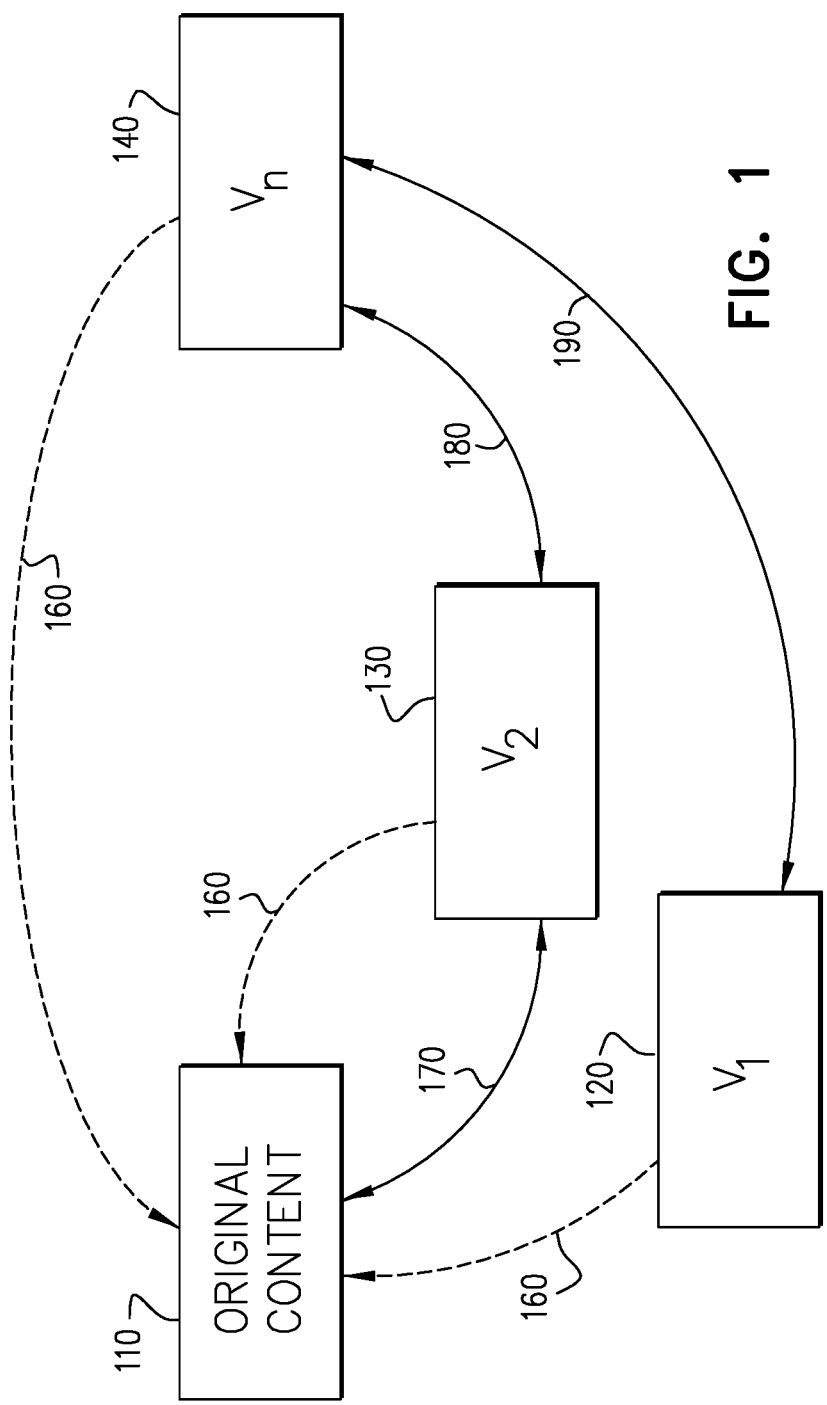
FIG. 1 is a simplified block diagram of a comparison of an original content item with similar content items, as performed by a comparison system which is constructed and operative in accordance with an embodiment of the present invention.

Reference is now made to FIG. 1, which is a simplified block diagram of a comparison of an original content item with similar content items, as performed by a comparison system which is constructed and operative in accordance with an embodiment of the present invention. A first content item 110, designated in FIG. 1 as an "Original Content" item, is depicted. A number of additional versions 120, 130, 140 of the content item are also depicted, designated in FIG. 1, respectively, as $V_1$, $V_2$, $V_n$. The additional versions $V_1$ 120, $V_2$ 130, and $V_n$ 140 of the Original Content item 110 are pirated copies of the Original Content item 110. Dotted arrows 160 indicate that the additional versions $V_1$ 120, $V_2$ 130, and $V_n$ 140 are somehow related to the Original Content item 110. The path of the relationship may be direct, as indicated by the solid arrow 170 between additional version $V_2$ 130 and the Original Content item 110. Alternatively, the relationship between the Original Content item 110 and one of the additional versions $V_1$ 120, and $V_n$ 140 may be indirect, as indicated by solid arrows, indicating a direct relationship between $V_2$ 130 and $V_n$ 140 (arrow 180), and a second direct relationship between $V_n$ 140 and $V_1$ 120 (arrow 190). Accordingly, as depicted in FIG. 1, the relationship between various content items 110, 120, 130, and 140 is: Original Content item 110-$V_2$ 130-$V_n$ 140-$V_1$ 120, where the dashes (i.e., "-") may be understood as showing a "chain" of direct relationships.

In cases where a direct relationship is detected (i.e., Original Content item 110-$V_2$ 130; $V_2$ 130-$V_n$ 140; and $V_n$ 140-$V_1$ 120), a threshold has been exceeded when the two versions are compared by the comparison system, as will be explained.

Persons who attempt to gain unauthorized access to copyrighted video (e.g., Original Content item 110) are sometimes referred to as "Hackers," "Rogues," or "Pirates". Such content, to which a hacker, rogue, or pirate has gained unauthorized or illegal access may be referred to as hacked content, rogue content, pirated content, or other similar terms. Pirates may attempt to distribute the content over rogue content distribution networks, peer-to-peer file sharing methods, and so forth. It is often the case that pirated copies of the copyrighted content have been somehow manipulated using various methods, which are typically known methods, in order to make automated detection of pirated copies difficult. Such manipulations include, for example: change of color, cropping, rotation/translation, audio mute/swap. Methods for comparison of versions of files of content are discussed below, particularly with reference to FIGS. 2-5. Content may include video content, audio content, or other formats of content which are suitable for consumption.

It is the opinion of the inventors that there is little value in pirating content that is freely available at one location on the Internet. For example, if a copy of content item is freely available for distribution, for example, if the content item has been legitimately uploaded to a video sharing service such as YouTube™, then copies which may exist elsewhere on the Internet are also legitimate (i.e., not pirated) copies of the content item. Hence, there is little reason for someone who is making a legitimate copy of the freely available content item, to manipulate the file in an attempt to disguise the file's source. By contrast, a content item which is uploaded in violation of intellectual property rights of a content owner may be subject to manipulations of the sort mentioned above. A level of correspondence between two files which have been differently manipulated, may be used to determine a level of confidence that the various versions of the content item (such as $V_1$ 120, $V_2$ 130, and $V_n$ 140) are copies with variations of the same Original Content source file (such as Original Content item 110).

The difference between two different pirated copies may be smaller than the difference between the original and a pirated copy. By way of example, a comparison method applied to Original Content item 110 and content item $V_n$ 140, or between Original Content item 110 and content item $V_1$ 120 may find that there is little or no correlation between the three versions. However, a high level of correlation may be detected between content item $V_n$ 140, and content item $V_1$ 120. For two versions of a content item to be considered similar the comparison rate between them should be greater than a predefined threshold. Thus, content item versions $V_1$ 120 and $V_n$ 140 may not be directly connected to the Original Content item 110 (note that the solid arrows 170, 180, and 190 do not indicate any direct connection between: content item $V_1$ 120 and content item $V_2$ 130; nor between Original Content item 110 and content item $V_1$ 120), but, since there is a path between them, they may still be identified as the same content item.

FIG. 1 may be viewed as an undirected graph, i.e., a set of nodes, in this case, content items, connected together by bi-directional edges. Specifically, since the content item $V_1$ 120 is connected to the content item $V_n$ 140 indicated by an edge, solid arrow 190, it is also true that the content item $V_n$ 140 is related to the content item $V_1$ 120. For the purposes of the discussion below, the graph of FIG. 1 will be referred to as a "correlation graph".

Figure 2:
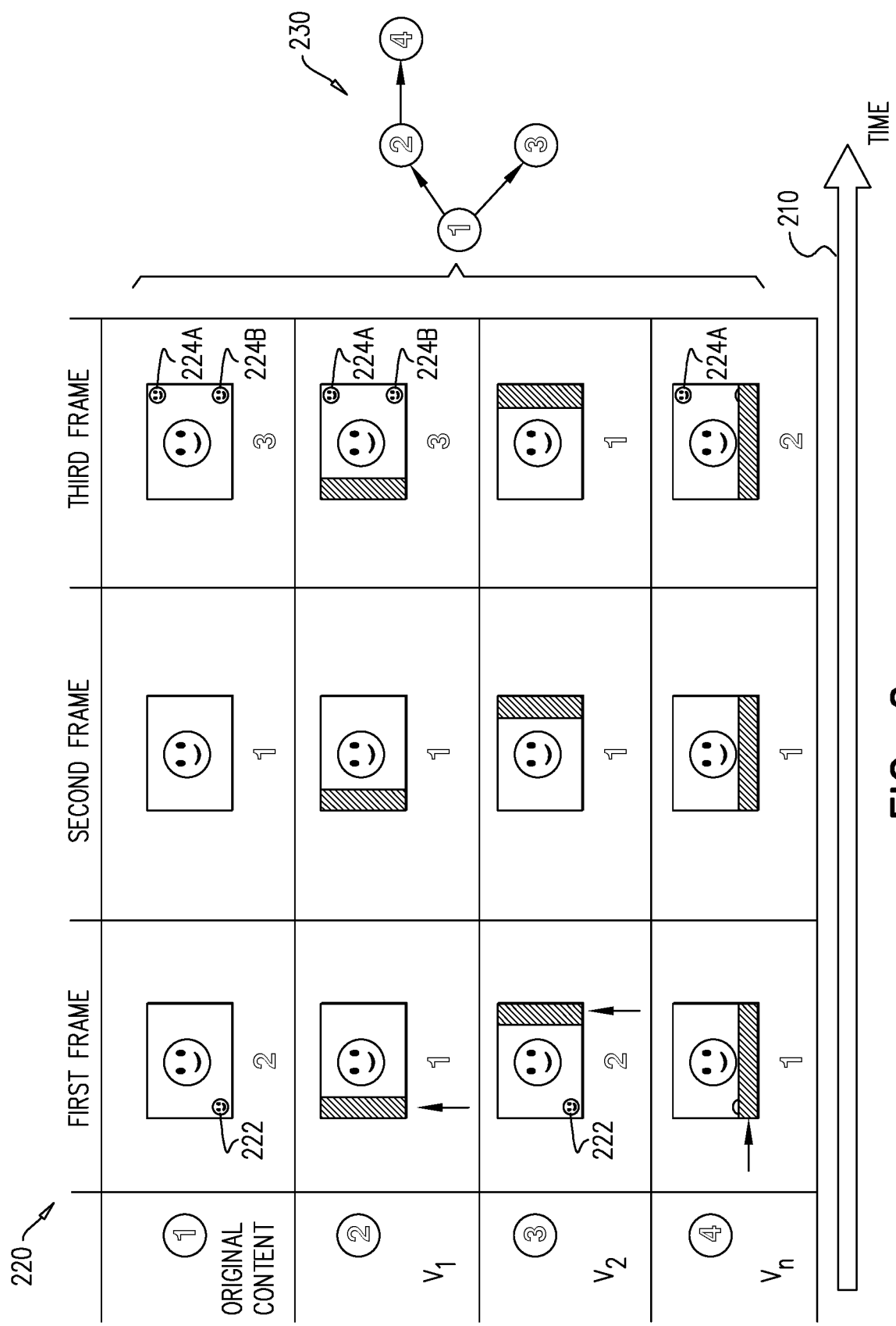
FIG. 2 is a depiction of an exemplary comparison of content items using the comparison of FIG. 1.

Prior to discussing the method utilized to construct the graph of FIG. 1, reference is made to FIG. 2, which is a depiction of an exemplary comparison of video content items using the comparison system of FIG. 1. A timeline 210 indicates that exemplary illustrations of frames of video content which appear on the left side of the figure occur in a video (i.e. the content item) prior to those events which are shown progressing to the right, which appear progressively later in the video, later than those events to their left. It is appreciated that the example provided in FIG. 2 and the following discussion is a discussion of a simplified example, provided in order to highlight operation of an embodiment, which a person of skill in the art would be able to generalize for application in a more complex situation.

A grid 220 shows video frames, respectively from the earliest to the latest in the video file. Columns in the grid 220 indicate: a first frame; a second frame; and a third frame. Rows in the grid 220 indicate versions of the content as depicted in FIG. 1. In order to simplify the upcoming figures, the Original Content item 110 is denoted, for convenience sake, as ①; Version $V_1$ 120 is denoted, for convenience sake, as ②; Version $V_2$ 130 is denoted, for convenience sake, as ③; and Version $V_n$ 140 is denoted, for convenience sake, as ④.

Each frame depicted in the grid 220 is shown with a number beneath it. The number is an indication of the number of occurrences of faces appearing in the frame. Face detection is a technique known in the art, and is a subcategory of feature detection, where a number of occurrences of a particular feature which appears in a given video frame is counted. Because, as discussed above, pirated videos are manipulated, different types of manipulations (as will be detailed below) are depicted, as well as the effect of the manipulation on the number occurrences of features. An arrow emphasizes the area of the manipulation in the First Frame column of the grid 220. So, for example, the second frame of Version $V_2$ 130 has a 1 beneath it, because only one face appears in the frame.

Content version $V_1$ 120 ② is shown as having been cropped on the left side of the frame. Content version $V_2$ 130 ③ is shown as having been cropped on the right side of the frame. Content version $V_n$ 140 ④ is shown as having been cropped on the bottom of the frame. Turning now to the number of faces in the Original Content item 110 ①, the first frame shows two faces as appearing in the frame; the second frame shows one face as appearing in the frame; and the third frame shows three faces as appearing in the frame. The effects of the cropping on the frames in the different versions of the content. $V_1$ 120; $V_2$ 130; and $V_n$ 140 (all from FIG. 1) is as follows:

Version $V_1$ 120 ② has been cropped on the left side of the frame. Thus, in the first frame, the face on the left side of the frame 222 does not appear. Only one face is counted, instead of the two faces which appear in the original frame. However, the left side cropping of the frames in version $V_1$ 120 has not affected the faces in the remaining second and third frames.

Version $V_2$ 130 ③ has been cropped on the right side of the frame. Thus, in the third frame, the two faces which appear on the right side of the original frame 224A, 224B do not appear version $V_2$ 130. However, the right side cropping of the frames in version $V_2$ 130 has not affected the faces in the remaining first and second frames.

Version $V_n$ 140 ④ has been cropped on the bottom of the frame. Thus, in the first frame, the face in the lower left corner of the frame 222 is mostly obscured by the cropping. Likewise, in the third frame, the face in the lower right of the frame 224B is mostly obscured by the cropping. The second face in the upper right of the frame 224A however, is not affected by the cropping.

Table 1 below summarizes the number of faces in each frame of each version of the content item (the information of which also appears in FIG. 2).

TABLE 1

|  | First Frame | Second Frame | Third Frame |
| --- | --- | --- | --- |
| Original Content item | 2 | 1 | 3 |
| $V_1$ | 1 | 1 | 3 |
| $V_2$ | 2 | 1 | 1 |
| $V_n$ | 1 | 1 | 2 |

Each of the different versions of the content is first compared to the original version of the content. Table 2 shows two of the rows in Table 1 for version $V_1$ 120 and the Original Content item 110.

TABLE 2

|  | First Frame | Second Frame | Third Frame |
| --- | --- | --- | --- |
| Original Content item | 2 | 1 | 3 |
| $V_1$ | 1 | 1 | 3 |
|  | Does not match | Match | Match |

Thus, version $V_1$ 120 is considered to be a copy of the Original Content item 110. A correlation (undirected) graph 230 is thereby created, where an arrow indicates that ②  is derived from ① (i.e., ①→②).

Likewise, Table 3 shows two of the rows in Table 1 for Version $V_2$ 130 and the Original Content item 110:

TABLE 3

|  | First Frame | Second Frame | Third Frame |
| --- | --- | --- | --- |
| Original Content item | 2 | 1 | 3 |
| $V_2$ | 2 | 1 | 1 |
|  | Match | Match | Does not match |

Thus, version $V_2$ 130 is considered to have been made as a copy of the Original Content item 110. As such, in the correlation graph 230, where version $V_2$ 130 is denoted, for convenience sake, as ③, an arrow in the correlation graph 230 (①→③) indicates that ③ is derived from ①.

However, as indicated in Table 4, below, comparing the row of Table 1 for version $V_n$ 140 to the row of Table 1 for Original Content item 110 shows the following result:

TABLE 4

|  | First Frame | Second Frame | Third Frame |
| --- | --- | --- | --- |
| Original Content item | 2 | 1 | 3 |
| $V_n$ | 1 | 1 | 2 |
|  | Does not match | Match | Does not match |

Accordingly, since there is only one matching cell between version $V_n$ 140 and Original Content item 110, ④ is not shown in the correlation graph 230 as (directly) derived from ①.

Comparing version $V_1$ 120 to version $V_n$ 140, gives the following (Table 5):

TABLE 5

|  | First Frame | Second Frame | Third Frame |
| --- | --- | --- | --- |
| $V_1$ | 1 | 1 | 3 |
| $V_n$ | 1 | 1 | 2 |
|  | Match | Match | Does not match |

Accordingly, correlation graph 230 shows that ④ is derived from ②. Although no table is provided here, by referring to the Table 1, it can be seen that version $V_2$ 130 has only one cell which matches version $V_n$ 140. Thus, correlation graph 230 does not show any direct correlation between ③ and ④.

Figure 3:
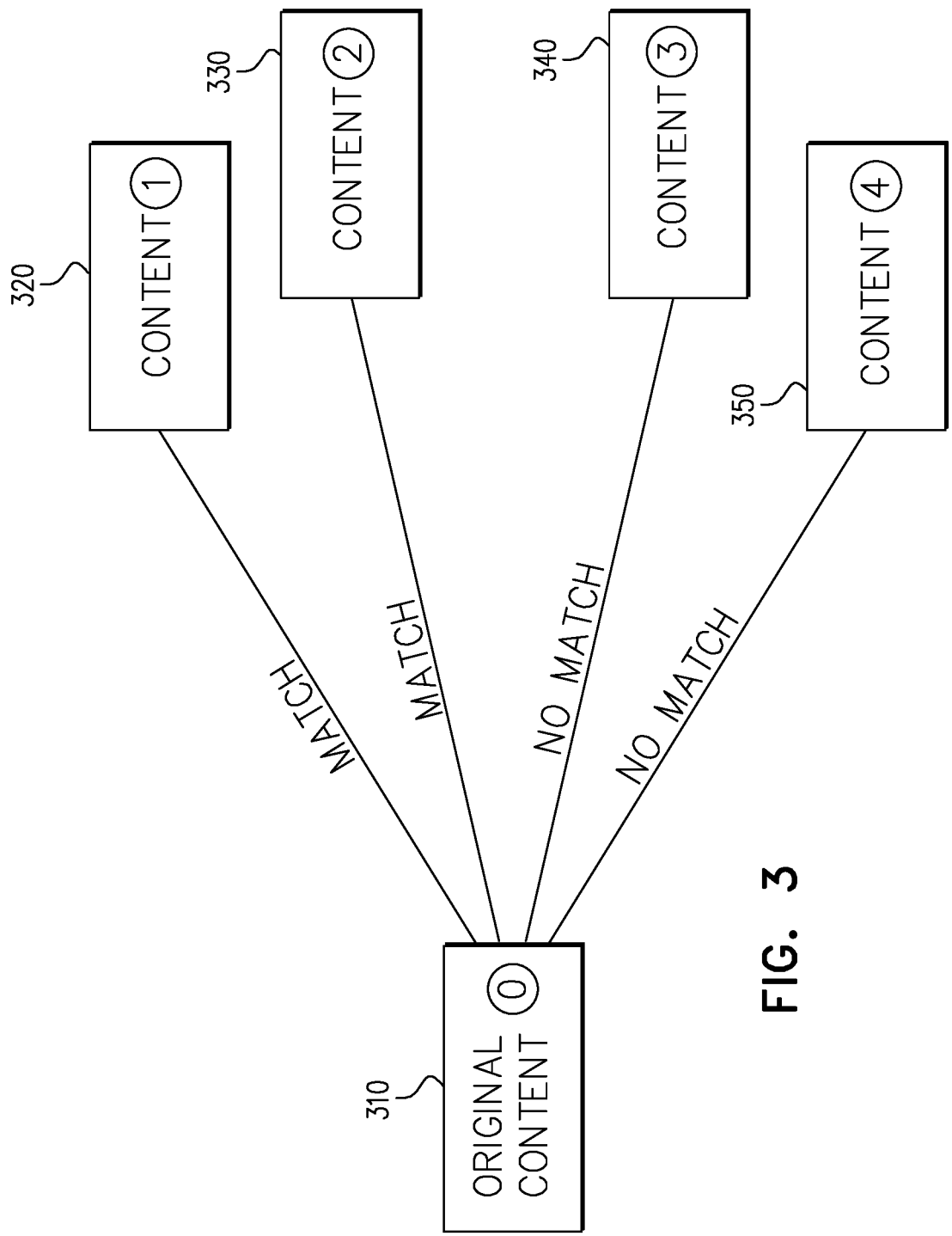
FIGS. 3-5 are a series of block diagrams detailing a method of determining a correlation graph, similar to a correlation graph depicted in FIG. 2.
Figure 4:
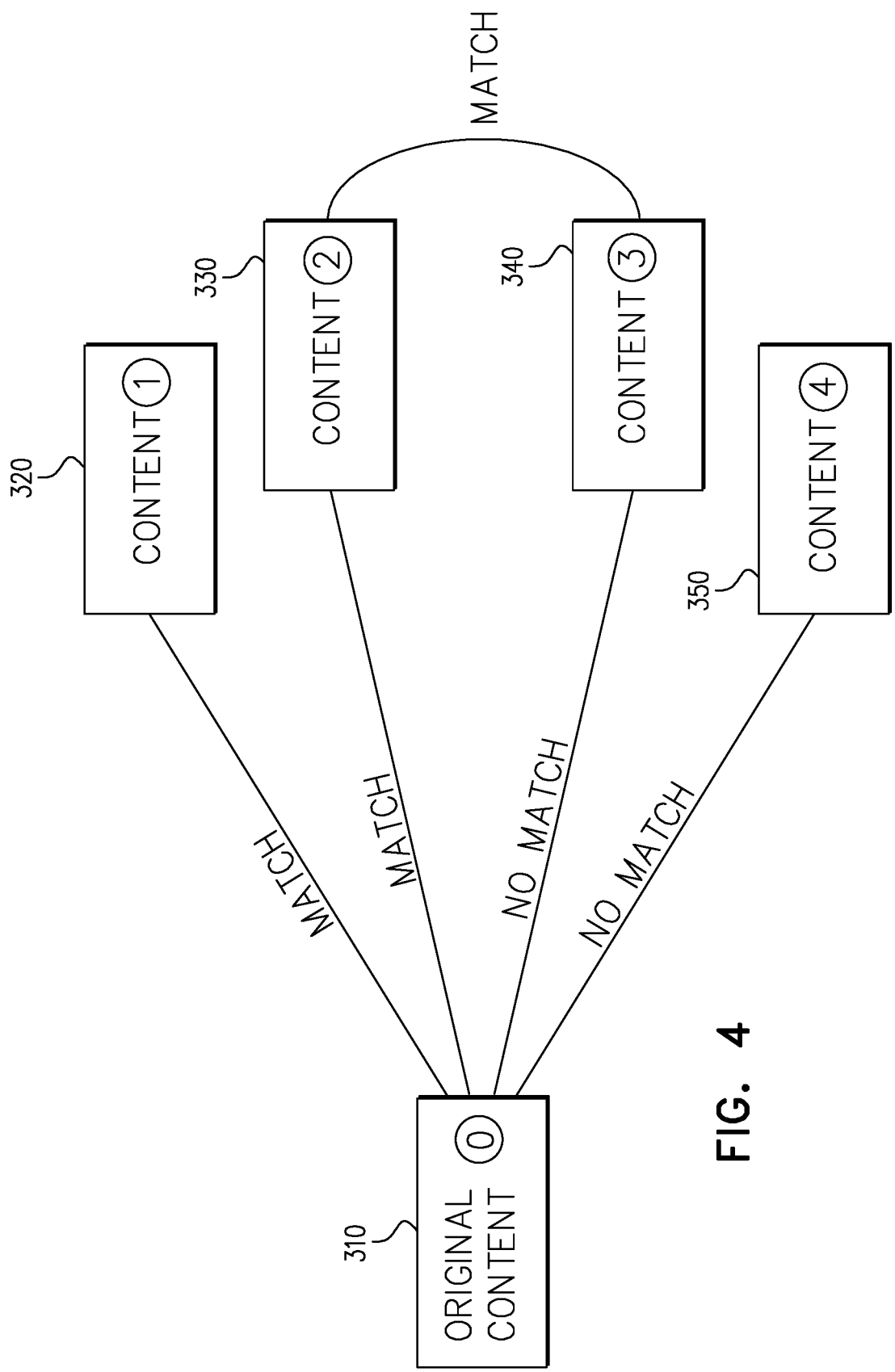
Figure 5:
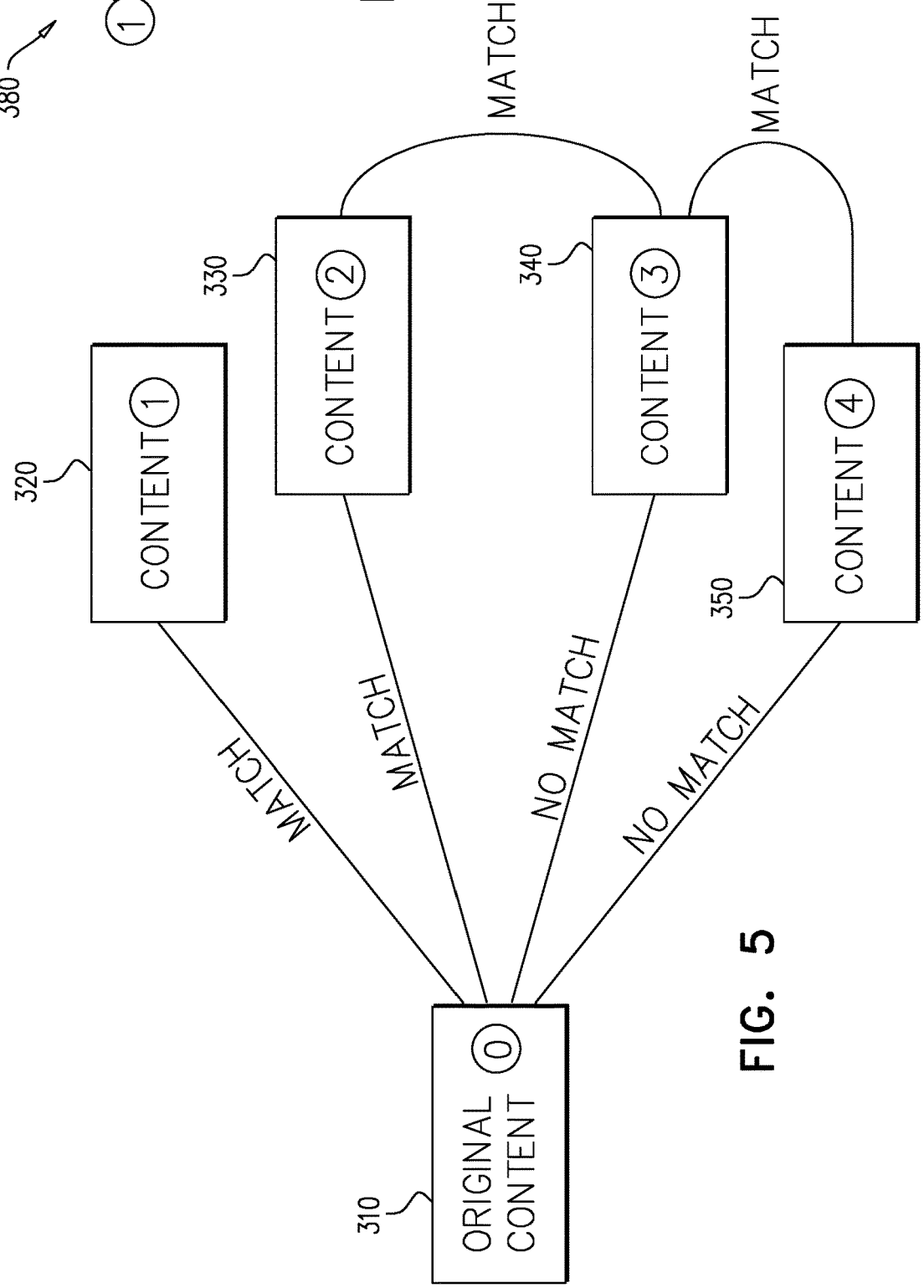

Reference is now made to FIGS. 3-5, which are a series of block diagrams detailing a method of determining a correlation graph, similar to the correlation graph 230 of FIG. 2. It is appreciated that the example given in FIGS. 3-5 uses an original content item ⓪ 310, and four additional content items, content ① 320; content ② 330; content ③ 340; and content ④ 350.

Using an appropriate feature matching technique, such as the face matching technique used in the example of FIG. 2, a match is determined between the original content item ⓪ 310 and content ① 320 and content ② 330. No match, however, is found, between content item ⓪ 310 and content ③ 340 and content ④ 350. In a second iteration of comparison, performed after the comparisons described above, depicted in FIG. 4, similar to the comparison of version $V_1$ 120 to version $V_n$ 140 in FIG. 2, content ③ 340 is found to match content ② 330. In a third iteration of comparison, depicted in FIG. 5, content ④ 340 is found to match content ④ 350.

Figure 6:
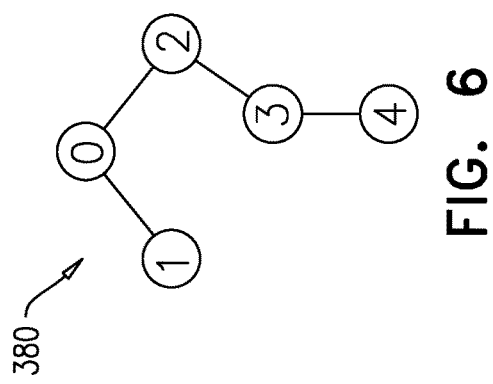
FIG. 6 is a correlation graph resulting from the example of FIGS. 3-5.

A correlation graph 380 resulting from the example of FIGS. 3-5 is depicted in FIG. 6, graphically summarizing the results of the iterations of comparison depicted in FIGS. 3-5.

Figure 7:
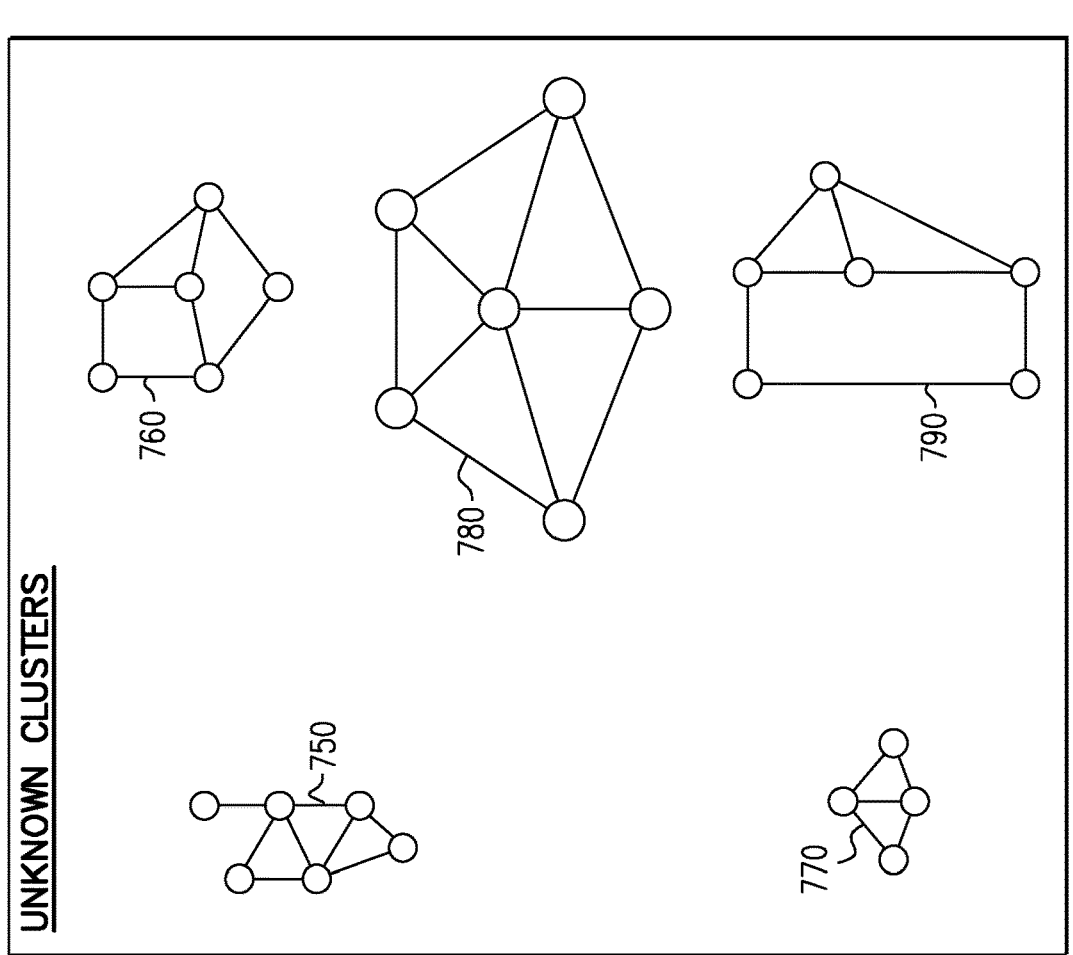
FIG. 7 is a depiction of a plurality of correlation graphs, such as the correlation graph of FIG. 6, for inputting into a machine learning system.

Reference is now made to FIG. 7, which is a depiction of a plurality of correlation graphs, such as the correlation graph 380 of FIG. 6, for inputting into a machine learning system. The machine learning system may comprise a neural network, a system implementing a clustering algorithm, a system implementing a naïve Bayes classification algorithm, or another appropriate machine learning method as is known in the art. A set of correlation graphs used as training data 710 is depicted on the left side of FIG. 7. The training data 710 data-set is input into the machine learning system to train the machine learning system to distinguish between types of correlation graphs which are indicative of non-pirated content and types of correlation graphs which are indicative of pirated content. The training data 710 data-set, which comprises correlation graphs of known non-pirated related content items, such as correlation graph 720 and correlation graph 725, as well as correlation graphs of known pirated related content items, such as correlation graph 730, is input into the machine learning system. The machine learning system, via machine learning processes known in the art learns to distinguish between the correlation graphs of non-pirated related content items, such as correlation graph 720 and correlation graph 725, which are typically non-sparse, and the correlation graphs of pirated content, such as correlation graph 730, which are typically sparse.

Correlation graphs of pirated content are assumed to be sparse because pirates typically manipulate the video so that automatic detection via simple comparison becomes difficult. Because of the variety of manipulations, including change of color, cropping, rotation/translation, audio mute/swap, there is a lower correlation between the different files compared. By contrast, however, correlation graphs of non-pirated content are assumed to be non-sparse because little manipulation is anticipated in the files. Some level of variety might be introduced in non-pirated content due to variations introduced in legitimate operations, such as trans-coding. Where two content items are compared and have a higher level of similarity, as is assumed to be the case for groups of non-pirated content items, the nodes are graphed closer to one another. On the other hand, two content items which are compared and have a lower level of similarity, as is assumed to be the case for groups of pirated content items, will result in nodes graphed further from one another. It is also understood in related fields of mathematics (such as, but not limited to directed graphs), the distinction between sparse and non-sparse correlation graphs may appear vague, and may depend on the context. However, as is known in the art, machine learning systems have been found to be successful in dealing with these vague distinctions.

Once the machine learning system has been trained using the machine learning techniques described above, groups of suspected videos may then be obtained and correlation graphs of unknown clusters 740 may be obtained using the methods described above. Unknown clusters such as correlation graphs 750, 760, 770, 780, and 790 may be typical of such unknown clusters. Each correlation graph input into the machine learning system, whether from the training data 710 data-set or from the unknown clusters 740 is a graph where each node represents the content and each edge represents a similarity factor.

The correlation graphs 750, 760, 770, 780, and 790 for the unknown clusters will then be individually fed into the machine learning system and will produce a result indicating if the content items in the group of compared content items yielding the correlation graphs 750, 760, 770, 780, and 790 are suspected of being groups of pirated content items, such as correlation graphs 780 and 790, or groups of non-pirated content items, such as correlation graphs 750, 760, and 770.

Figure 8:
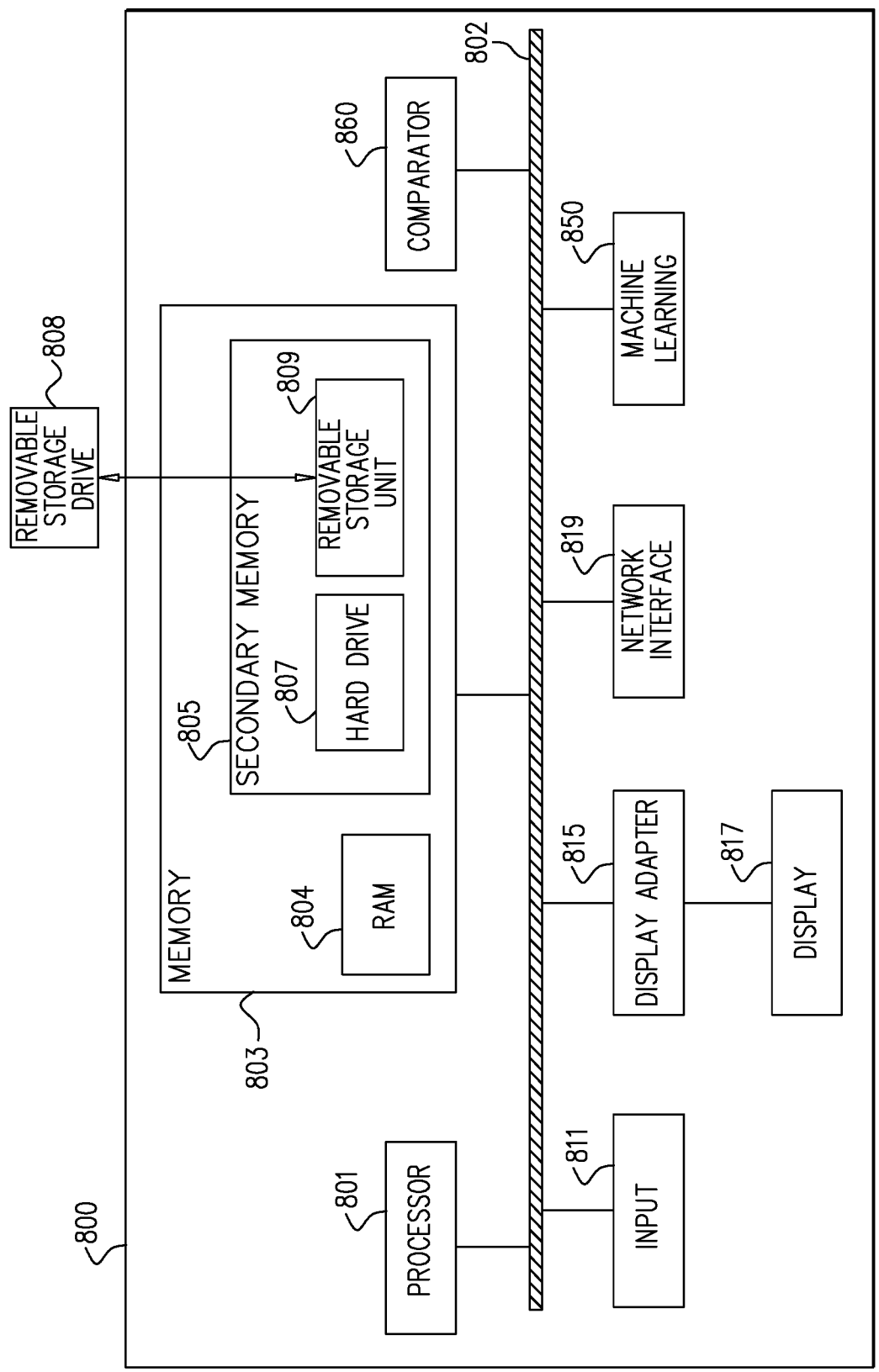
FIG. 8 is a block diagram of an exemplary device comprising one or both of the machine learning system and a comparator which performs the comparison of the content items as described above with reference to FIGS. 2-6.

Reference is now made to FIG. 8, which is a block diagram of an exemplary device 800 comprising one or both of the machine learning system and a comparator which performs the comparison of the content items as described above with reference to FIGS. 2-6. The exemplary device 800 is suitable for implementing any of the systems, methods or processes described above. The exemplary device 800 comprises one or more processors, such as processor 801, providing an execution platform for executing machine readable instructions such as software. One of the processors 801 may be a special purpose processor operative to perform the method for piracy detection described herein above.

Commands and data from the processor 801 are communicated over a communication bus 802. The system 800 also includes a main memory 803, such as a Random Access Memory (RAM) 804, where machine readable instructions may reside during runtime, and a secondary memory 805. The secondary memory 805 includes, for example, a hard disk drive 807 and/or a removable storage drive 808, representing a floppy diskette drive, a magnetic tape drive, a compact disk drive, a flash drive, etc., or a nonvolatile memory where a copy of the machine readable instructions or software may be stored. The secondary memory 805 may also include ROM (read only memory), EPROM (erasable, programmable ROM), EEPROM (electrically erasable, programmable ROM). In addition to software, data representing any one or more of the various content items discussed herein throughout, for example, and without limiting the generality of the foregoing, original content item 110, additional versions $V_1$ 120, $V_2$ 130, and $V_n$ 140 of FIG. 1, and correspondingly, FIG. 2, as well as original content item ⓪ 310, content ① 320, content ② 330, content ③ 340, and content ④ 350 of FIGS. 3-6; the correlation graphs such as correlation graph 380 of FIG. 6, the training data 710, and unknown clusters 740 of FIG. 7; or other similar data, may be stored in the main memory 803 and/or the secondary memory 805. The removable storage drive 808 reads from and/or writes to a removable storage unit 809 in a well-known manner.

A user can interface with the exemplary device 800 via a user interface which includes input devices 811, such as a touch screen, a keyboard, a mouse, a stylus, and the like in order to provide user input data. A display adaptor 815 interfaces with the communication bus 802 and a display 817 and receives display data from the processor 801 and converts the display data into display commands for the display 817.

A network interface 819 is provided for communicating with other systems and devices via a network (such as network 155 of FIG. 1). The network interface 819 typically includes a wireless interface for communicating with wireless devices in the wireless community. A wired network interface (e.g. an Ethernet interface) may be present as well. The exemplary device 800 may also comprise other interfaces, including, but not limited to Bluetooth, and HDMI.

The machine learning system 850, the use of which is described above with reference to FIG. 7, may be among the software and/or specialized hardware executed or controlled by the processor 801. As noted above, the machine learning system 850 may comprise any appropriate machine learning methods as are known in the art, including, but not limited to a neural network, a clustering algorithm, or a naïve Bayes classification algorithm. A comparator 860, which may itself comprise either hardware, software, or a combination of both hardware and software, which performs the comparing method described above with reference to FIGS. 2-5, and which outputs the correlation graphs such as correlation graph 380 of FIG. 6, is also typically executed or controlled by the processor 801.

It will be apparent to one of ordinary skill in the art that one or more of the components of the exemplary device 800 may not be included and/or other components may be added as is known in the art. The exemplary device 800 shown in FIG. 8 is provided as an example of a possible platform that may be used, and other types of platforms may be used as is known in the art. One or more of the steps described above may be implemented as instructions embedded on a computer readable medium and executed on the exemplary device 800. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

Figure 9:
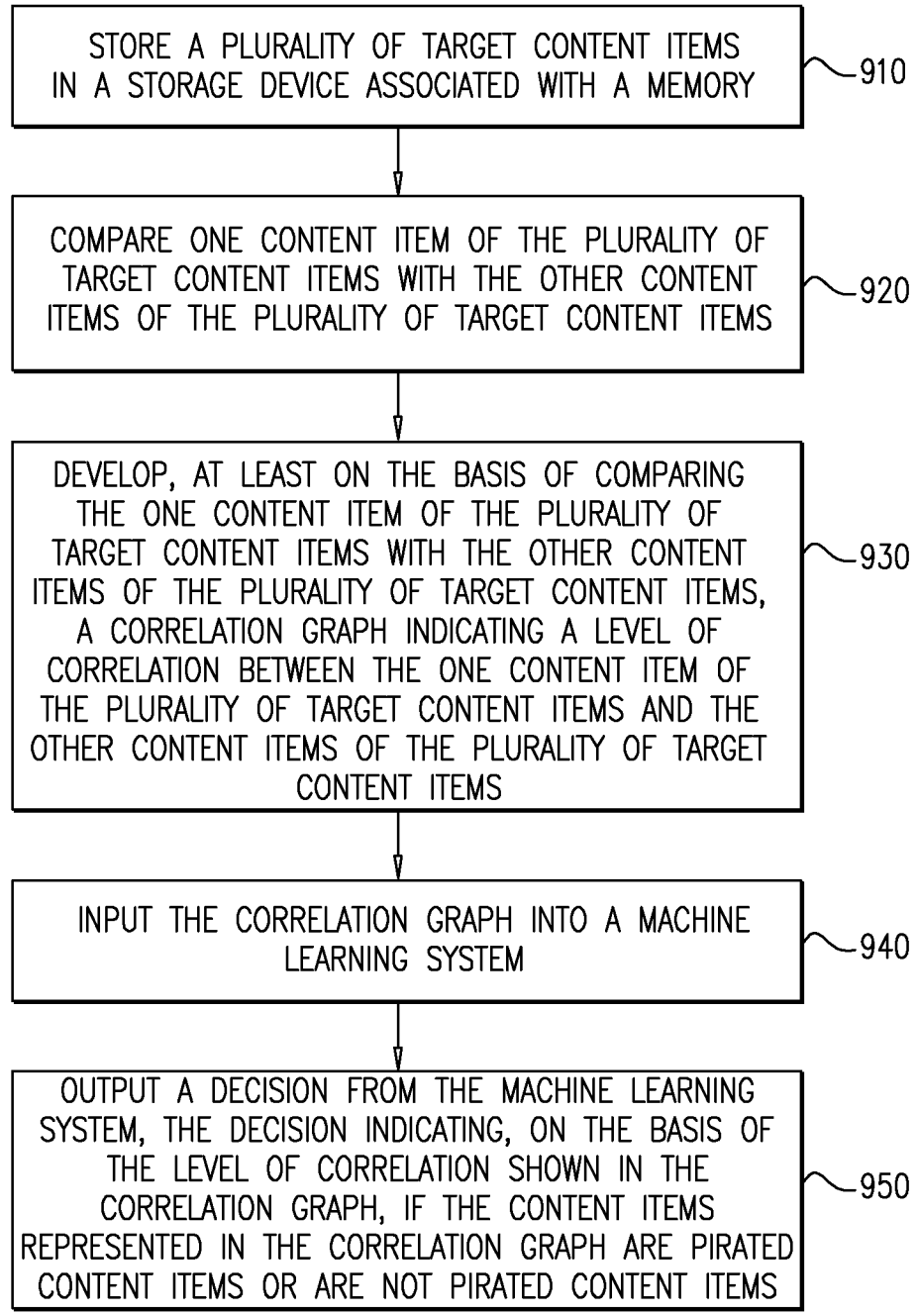
FIG. 9 is a simplified flow chart diagram of a method for an embodiment of the system FIG. 1.

Reference is now made to FIG. 9, which is a simplified flow chart diagrams of a method for an embodiment of the system FIG. 1. At step 910, a plurality of target content items are stored in a storage device associated with a memory.

At least one content items of the plurality of target content items are compared with the other content items of the plurality of target content items (step 920). At least on the basis of comparing the at least one content item of the plurality of target content items with the other content items of the plurality of target content items, a correlation graph indicating a level of correlation between each one content item of the plurality of target content items and the other content items of the plurality of target content items is developed (step 930).

At step 940 the correlation graph is input into a machine learning system. At step 950 a decision is output from the machine learning system, the decision indicating, on the basis of the level of correlation shown in the correlation graph, if the content items represented in the correlation graph are pirated content items or are not pirated content items.

It is appreciated that software components of the present invention may, if desired, be implemented in ROM (read only memory) or non-volatile memory form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system comprising:
   a storage device and a memory operative to store a plurality of target content items comprising an original content item and additional versions of the original content item;
   a comparator configured to execute a process, wherein the process is operative to:
      perform a first iteration of comparison by comparing the original content item with one or more of the additional versions of the original content item,
      perform a second iteration of comparison by comparing particular one of the additional versions of the original content item with at least one other of the additional versions of the original content item,
      based on the first and second iterations of comparison, develop a correlation graph indicating at least a level of correlation between the original content item and the one or more of the additional versions of the original content item and a level of correlation between the particular one of the additional versions of the original content item and the at least one other of the additional versions of the original content item, and
      generate training data comprising a set of correlation graphs that includes the correlation graph; and
   a machine learning system that is trained using the generated training data, wherein the trained machine learning system is operative to:
      receive, as an input, the correlation graph, and
      output a decision which indicates, based on the levels of correlation indicated by the correlation graph, which of the additional versions of the original content item are pirated content items or non-pirated content items.

2. The system according to claim 1 wherein the comparator is controlled by a processor.

3. The system according to claim 1 wherein the machine learning system comprises a neural network.

4. The system according to claim 1 wherein the machine learning system comprises a neural network which is built as a result of being trained.

5. The system according to claim 1 wherein the machine learning system comprises a naïve Bayesian classification system.

6. The system according to claim 1 wherein the machine learning system comprises a system implementing a clustering algorithm.

7. The system according to claim 1 wherein a node of the correlation graph represents one of the content items, and a length of an edge between two nodes of the correlation graph represents a similarity factor between two content items represented by the two nodes.

8. The system according to claim 7 wherein two content items of the plurality of target content items having a first similarity factor are graphed as two nodes with a smaller distance between them than two nodes representing two content items of the plurality of target content items having a second similarity factor, wherein the first similarity factor is higher than the second similarity factor.

9. A method comprising:
   storing a plurality of target content items in a storage device associated with a memory, the plurality of target content items comprising an original content item and additional versions of the original content item;
   performing, by a comparator, a first iteration of comparison by comparing the original content item with one or more of the additional versions of the original content item;
   performing, by the comparator, a second iteration of comparison by comparing a particular one of the additional versions of the original content item with at least one other of the additional versions of the original content item;
   based on the first and second iterations of comparison, developing, by the comparator, a correlation graph indicating at least a level of correlation between the original content item and the one or more of the additional versions of the original content item and a level of correlation between the particular one of the additional versions of the original content item and the at least one other of the additional versions of the original content item;
   generating, by the comparator, training data comprising a set of correlation graphs that includes the correlation graph;
   training, by the comparator, a machine learning system using the generated training data;
   after the training of the machine learning system, inputting the correlation graph into the machine learning system; and
   outputting a decision from the machine learning system, the decision indicating based on the levels of correlation indicated by the correlation graph, which of the additional versions of the original content item are pirated content items or non-pirated content items.

10. The method according to claim 9 wherein the comparator is controlled by a processor.

11. The method according to claim 9 wherein the machine learning system comprises a neural network.

12. The method according to claim 9 wherein the machine learning system comprises a neural network which is built as a result of being trained.

13. The method according to claim 9 wherein the machine learning system comprises a naïve Bayesian classification machine learning system.

14. The method according to claim 9 wherein the machine learning system comprises a clustering algorithm machine learning system.

15. The method according to claim 9 wherein a node of the correlation graph represents one of the content items, and a length of an edge between two nodes of the correlation graph represents a similarity factor between two content items represented by the two nodes.

16. The method according to claim 15 wherein two content items of the plurality of target content items having a first similarity factor are graphed as two nodes with a smaller distance between them than two nodes representing two content items of the plurality of target content items having a second similarity factor, wherein the first similarity factor is higher than the second similarity factor.

* * * * *

UNITED STATES PATENT AND TRADEMARK OFFICE
CERTIFICATE OF CORRECTION

PATENT NO. : 11,176,452 B2
APPLICATION NO. : 15/444351
DATED : November 16, 2021
INVENTOR(S) : Porat et al.

Page 1 of 1

It is certified that error appears in the above-identified patent and that said Letters Patent is hereby corrected as shown below:

In the Specification

Column 9, Line 41, please amend as shown:
a particular one of the additional versions of the origi- Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*